March 15, 1938.  C. WELHART  2,111,499
GLASS CONTAINER
Filed July 22, 1936
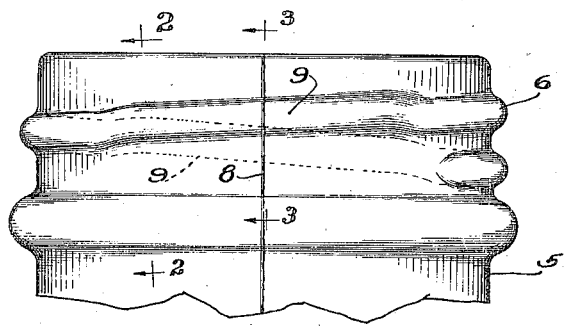
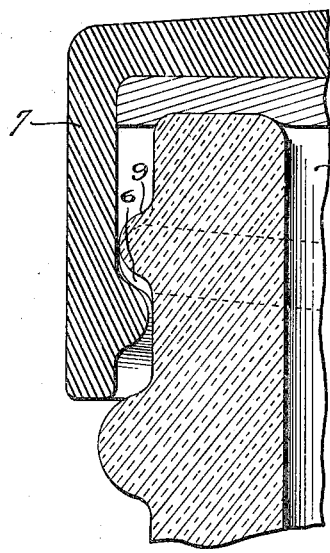
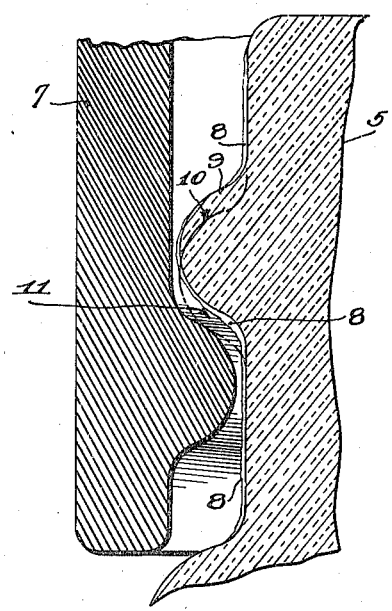
Charles Welhart
INVENTOR.
BY Rule & Hoge
ATTORNEYS.

Patented Mar. 15, 1938

2,111,499

UNITED STATES PATENT OFFICE 2,111,499

GLASS CONTAINER

Charles Welhart, Alton, Ill., assignor to Owens-Illinois Glass Company, a corporation of Ohio Application July 22, 1936, Serial No. 91,892

3 Claims. (Cl. 215—31)

The present finish relates to improvements in glass containers having continuous screw threads.

In the production of glass containers on forming machines employing partible molds, there is a tendency for the molds to form "fins" or sharp edges on the container at the parting line. These fins occur mainly on the neck finish of the container which is formed as the molten glass is drawn into the mold and allowed to chill immediately on contact with the comparatively cool walls thereof. The neck portion being finally formed may not be reheated to remove any excessively chilled portions as is the body of the blank. Should the neck mold halves not register absolutely, a fin or bead is permanently formed on the container neck. This is an objectionable feature though common and occurs in a more or less degree as the mechanism and molds become worn and fail to register properly. The fins when formed on the screw threads prevent satisfactory engagement with the threaded closure and at times tend to hinder the application thereof. Particularly are the fins objectionable when a closure formed of a plastic material such as synthetic resin or a hard rubber composition is employed. The relatively sharp edges of the fins scrape or shave particles from the molded threads which inadvertently find their way into the contents of the container. To this end I have provided means whereby the formation of fins on the threads do not interfere with the application of a closure thereto.

Another object of the invention is the provision of a continuous screw thread on a container neck in which the thread is offset throughout a portion thereof adjacent the mold parting line.

Another object is the provision of a continuous screw thread of constant cross-sectional area, a portion of which is raised above the line of contact with a threaded closure.

Other objects and features of novelty will be in part apparent and in part pointed out in the course of the following description.

In the drawing:

Fig. 1 is a side elevational view of a bottle finish of which my invention forms a part;

Fig. 2 is an enlarged vertical sectional view taken on line 2—2 of Fig. 1; and

Fig. 3 is a similar view taken at the mold parting line and indicated by the line 3—3 in Fig. 1.

Referring to the drawing, the numeral 5 indicates the neck portion of a container, the body (not shown) of which may be of any size or shape. A continuous screw thread 6 encircles the outer end of the neck portion for engagement with a threaded closure 7 which may be formed of a plastic material or from sheet metal.

The invention relates primarily to bottles having neck finishes of 15 to 33 mm. in diameter to which it has become the custom to apply closures of molded material. Difficulties have been encountered in the use of molded caps by the formation of fins 8 or beads and which also at times take the form of a protruding seam or rib occurring at the mold parting line on the bottle finish. The fins are unavoidably caused by improper registration of the forming molds due to excessive wear in the forming machine mechanism as well as the mold. The resulting fins are not always of sufficient dimension to prevent the use of the container but occur with such frequency that steps have been taken to remove their interference.

For this purpose I have provided the thread 6 with an offset or raised portion 9 extending a short distance on either side of the mold parting line. The offset portion is of the same cross-sectional area as the remainder of the thread and serves to strengthen the bottle neck to a greater degree than is possible with interrupted or reduced threads. Fig. 2 illustrates a molded closure in sealing engagement with a bottle finish and shows the thread 6 in engagement with the threaded cap.

In Fig. 3 the thread 6 is indicated by the dot and dash line 10, the intervening space 11 between the portion 9 of the thread and the thread on the cap precluding any possibility of contact between the fin 8 and the closure. In practice it has been found that raising the thread forming the offset portion 9 approximately .008 inch provides adequate clearance to avoid the projecting fin.

Modifications may be resorted to within the spirit and scope of the appended claims.

I claim:

1. A glass container having a reduced neck portion, a continuous screw thread of uniform cross-sectional area encircling said neck, diametrically opposed longitudinal seams on the outer surface of the neck, and a raised portion in said thread extending a short distance on either side of said seam.

2. A glass container having a reduced neck portion, a continuous screw thread encircling the neck, and having diametrically opposed portions thereof raised upwardly with respect to the axis of the container out of alignment with the remainder of the thread, and vertically disposed protruding seams intersecting said raised portions, the vertical cross-sectional area of the raised portion at the seam being equal to that of the remainder of the thread.

3. A glass container having a reduced neck portion, a continuous screw thread of uniform cross-sectional area completely encircling the neck, vertical diametrically opposed protruding fins intersecting said thread, and vertically offset sections formed in the thread which are offset a distance greater than the depth of the fins adjacent the fins to prevent said fins from extending below the remainder of the thread.

CHARLES WELHART.